(12) United States Patent
Pauly

(10) Patent No.: US 10,547,649 B2
(45) Date of Patent: *Jan. 28, 2020

(54) DEVICE AND METHOD FOR VIRTUAL PRIVATE NETWORK CONNECTION ESTABLISHMENT

(71) Applicant: APPLE INC., Cupertino, CA (US)

(72) Inventor: Thomas F. Pauly, Campbell, CA (US)

(73) Assignee: Apple Inc., Cupertino, CA (US)

( * ) Notice: Subject to any disclaimer, the term of this patent is extended or adjusted under 35 U.S.C. 154(b) by 96 days.

This patent is subject to a terminal disclaimer.

(21) Appl. No.: 15/699,006

(22) Filed: Sep. 8, 2017

(65) Prior Publication Data

US 2017/0374110 A1 Dec. 28, 2017

Related U.S. Application Data

(63) Continuation of application No. 14/289,308, filed on May 28, 2014, now Pat. No. 9,762,625.

(51) Int. Cl.
*H04L 29/06* (2006.01)
*H04L 29/12* (2006.01)
*H04L 29/08* (2006.01)

(52) U.S. Cl.
CPC ...... *H04L 65/1069* (2013.01); *H04L 61/1511* (2013.01); *H04L 63/0272* (2013.01); *H04L 67/02* (2013.01); *H04L 69/16* (2013.01); *H04L 61/2514* (2013.01); *H04L 63/168* (2013.01)

(58) Field of Classification Search
CPC ............ H04L 65/1069; H04L 61/1511; H04L 63/0272; H04L 67/02; H04L 69/16; H04L 61/2514; H04L 63/168
See application file for complete search history.

(56) References Cited

U.S. PATENT DOCUMENTS

| 2004/0039827 | A1* | 2/2004 | Thomas | H04L 29/06 709/228 |
| 2005/0273849 | A1* | 12/2005 | Araujo | H04L 63/0281 726/12 |
| 2015/0195182 | A1* | 7/2015 | Mathur | H04L 43/50 714/27 |

* cited by examiner

*Primary Examiner* — Viet D Vu
(74) *Attorney, Agent, or Firm* — Fay Kaplun & Marcin, LLP

(57) ABSTRACT

A method, client device and non-transitory computer readable storage medium for connecting to a virtual private network (VPN). A request to connect to a destination identified by a hostname is received from an application executed on the client device and a domain name system (DNS) lookup functionality is performed on the hostname, the DNS lookup functionality returning an address. It is then determined whether the returned address is a redirected address, whether a hypertext transmission protocol secure (HTTPS) probe configured for the hostname fails, or whether the returned address matches a cached route in which a transmission control protocol (TCP) connection establishment is unsuccessful. If any of the returned address is a redirected address, the HTTPS probe fails or the returned address matches the cached route and the TCP connection establishment is unsuccessful, the client device is connected to the VPN.

20 Claims, 3 Drawing Sheets

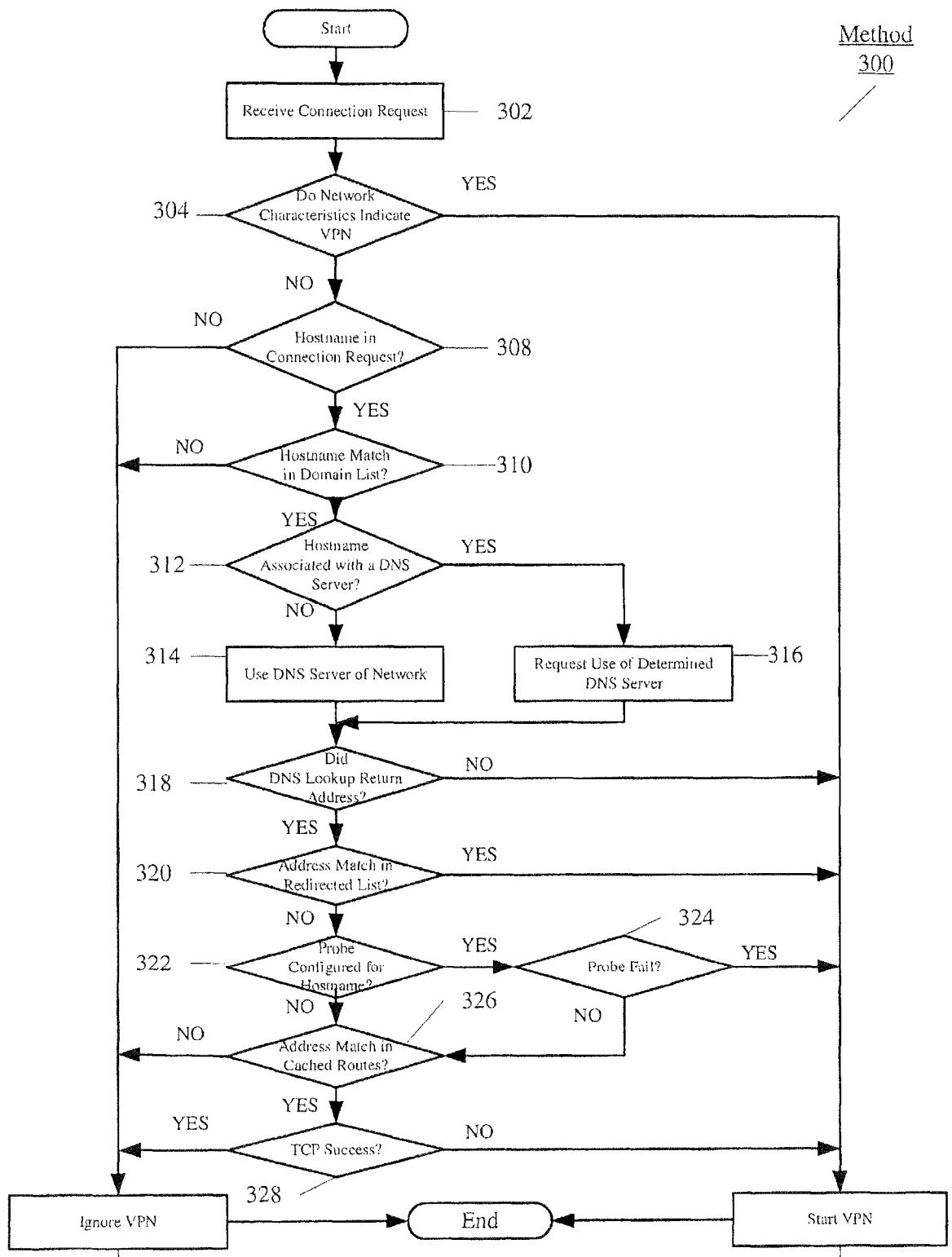

DEVICE AND METHOD FOR VIRTUAL PRIVATE NETWORK CONNECTION ESTABLISHMENT

BACKGROUND

In many Virtual Private Network ("VPN") systems, a VPN server is situated within a private network that is operated on behalf of a business or other entity. A client device (such as a smartphone or personal computer) executes VPN client software, and establishes a connection to the VPN server through a public network (such as the Internet) where the client device is currently. Data communicated using this connection is encrypted, and the connection is sometimes characterized as an encrypted "tunnel" through the public network. Once the connection is established, the client device can securely access resources available on the private network where the VPN server operates. Additionally, in some instances, the client device may access resources outside of the private network by way of the VPN connection into the private network; as an example, the client device may transmit/receive data to/from a publicly available web server on the Internet, with all of the traffic between the client and the web server traversing the private network via the VPN connection.

SUMMARY

This document describes, inter alia, a method, client device and non-transitory computer readable storage medium for connecting to a virtual private network (VPN). A request to connect to a destination identified by a hostname is received from an application executed on the client device and a domain name system (DNS) lookup functionality is performed on the hostname, the DNS lookup functionality returning an address. It is then determined whether the returned address is a redirected address, whether a hypertext transmission protocol secure (HTTPS) probe configured for the hostname fails, wherein the HTTPS probe failing is indicative of a second destination being unavailable in a public network, wherein the HTTPS probe succeeding is indicative of the second destination being publicly available on the public network, or whether the returned address matches a cached route in which a transmission control protocol (TCP) connection establishment is unsuccessful, wherein the TCP connection establishment being unsuccessful is indicative of the destination being unavailable in the public network, wherein the TCP connection establishment succeeding is indicative of a connection being established with the destination on the public network. If any of the returned address is a redirected address, the HTTPS probe fails or the returned address matches the cached route and the TCP connection establishment is unsuccessful, the client device is connected to the VPN.

This Summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 3 shows a method for establishing a connection to a virtual private network.

DETAILED DESCRIPTION

Figure 1:
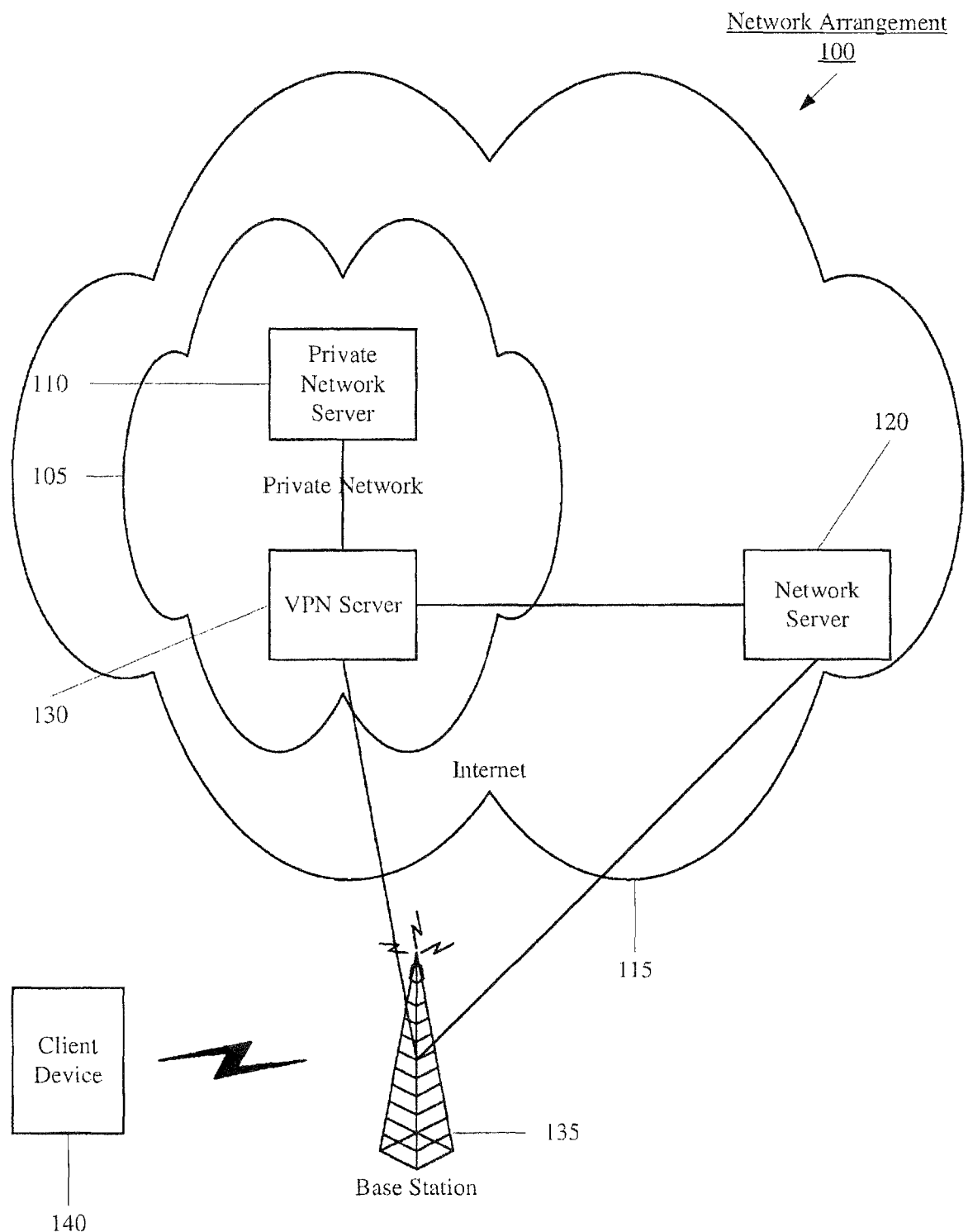
FIG. 1 shows an exemplary network arrangement for establishing a connection to a virtual private network.

The exemplary embodiments may be further understood with reference to the following description and the related appended drawings, wherein like elements are provided with the same reference numerals. The exemplary embodiments are related to the establishment of a connection between a client device and a private network using a virtual private network (VPN) via a public network.

Description of FIG. 1

FIG. 1 shows an exemplary network arrangement 100 for establishing a connection between a private network 105 and a client device 140 using a VPN. Specifically, the network arrangement 100 provides a gateway for the client device 140 to establish a connection with a VPN server 130 providing the VPN. The network arrangement 100 may include a plurality of components such as the private network 105, a private network server 110, an overall network including the private network 105 and a public network such as the Internet 115, a network server 120, the VPN server 130, a base station 135, and the client device 140.

The private network 105 may be any localized network utilizing private IP addresses. The private network server 110 may be the network component that manages the private network 105. The private network 105 may include further components such as a private network database (not shown), a network address translation (NAT) device (not shown), etc. Using the NAT device or a proxy server (not shown), the private network 105 may connect to the Internet 115. The Internet 115 may be any global network that is managed by administrative entities such as the Regional Internet Registry (RIR). The network server 120 may represent a public destination that is available within the Internet 115.

The private network 105 is shown in FIG. 1 as a network within the Internet 115. To reach the private network 105, the client device 140 may utilize the VPN, specifically the VPN server 130. The VPN may be managed by the VPN server 130 and handles connections to the private network 105 from remote devices such as the client device 140.

The base station 135 may be an access point or other network component that enables the client device 140 that connects thereto to establish a connection to the Internet 115. It should be noted that the client device 140 may connect to a public network that is also part of the Internet 115. In this manner, the client device may further establish a connection to other destinations including public destinations such as the network server 120 and the other available networks such as the private network 105 (upon proper credentials being provided). Thus, the client device 140 may establish a connection to the Internet 115 (and/or the public network) and the private network 105 by associating with the base station 135 using any corresponding association process.

As will be described in further detail below, the client device 140 may execute a network connection evaluation application (NCEA) that determines, based on a connection request (i.e., a request to connect to a host, such as a web server) at the client device 140, whether a VPN connection should be established between the client device 140 and the VPN server 130 to handle the connection request. In various embodiments, the NCEA may be implemented as a module within another application (e.g., as a submodule within a web browser or a VPN connection application, or other type of application), as a module within the operating system of the client device 140, or as a standalone application. In some embodiments, the NCEA may evaluate connection requests received from other modules/applications running on the client device 140; as an example, during the course of a web browsing session on the client device 140, the NCEA may receive a connection request from a web browser application.

The following summarizes an exemplary manner of determining whether a connection request results in a connection to the VPN being established, as performed by the NCEA application on the client device 140. It may first be determined whether the characteristics of the network to which the client device 140 is attempting to connect. If the characteristics of the network match predetermined characteristics, the client device 140 will attempt to connect to the VPN. An example of characteristics that may be analyzed here include: the IP address(es) of the DNS server(s) that serve hosts on the network; the type of the network (e.g., whether the network is a cellular network or a WiFi network); identifying information of the network (such as a Service Set Identifier (SSID), in an instance where the network is a WiFi network); and/or other information. When these characteristics are determined, the connection attempt to the VPN may be triggered. If this analysis of the network characteristics does not indicate that a connection attempt should be made, the connection request is analyzed to determine if it includes a hostname or an address (e.g., IP address). If the request includes an address, the connection to the VPN is ignored. Throughout this document, it will be described that the connection to the VPN may be "ignored"; when it is stated in this document that the client device 140 "ignores" the VPN in response to some condition, that indicates that the client device 140 does not attempt to connect to the VPN in response to the condition. In this example, the condition is whether the connection request includes an address. If the condition of the connection request including an address is satisfied, the client device 140 should not attempt to connect to the VPN, i.e., the VPN is ignored.

If the connection request includes a hostname, it may be determined whether the hostname has a match in a domain list. If no match, the connection to the VPN 125 is ignored. If matching, a DNS lookup may be performed to determine if the hostname returns an address from the Internet 115. If the DNS lookup fails or times out, an attempt to connect to the VPN is performed. If the DNS lookup returns an address, it may be determined whether the address is a redirected address. If the address is a selected redirected address, an attempt to connect to the VPN is performed. If not a redirected address, it may be determined whether a HTTPS probe is configured for the hostname. If the HTTPS probe is configured for the hostname but fails, an attempt to connect to the VPN is performed. If the HTTPS probe is not configured for the hostname or if the HTTPS probe is configured for the hostname and succeeds, it may be determined whether the address matches a cached route. If the address does not match a cached route, the connection to the VPN is ignored. If there is a match to a cached route, it may be determined whether a TCP connection succeeds. If the TCP connection succeeds, the connection to the VPN is ignored. However, if the TCP connection is unsuccessful (e.g., fails or times out), an attempt to connect to the VPN is performed. Further details regarding this process will be provided below, including but not limited to with reference to FIG. 3.

Figure 2:
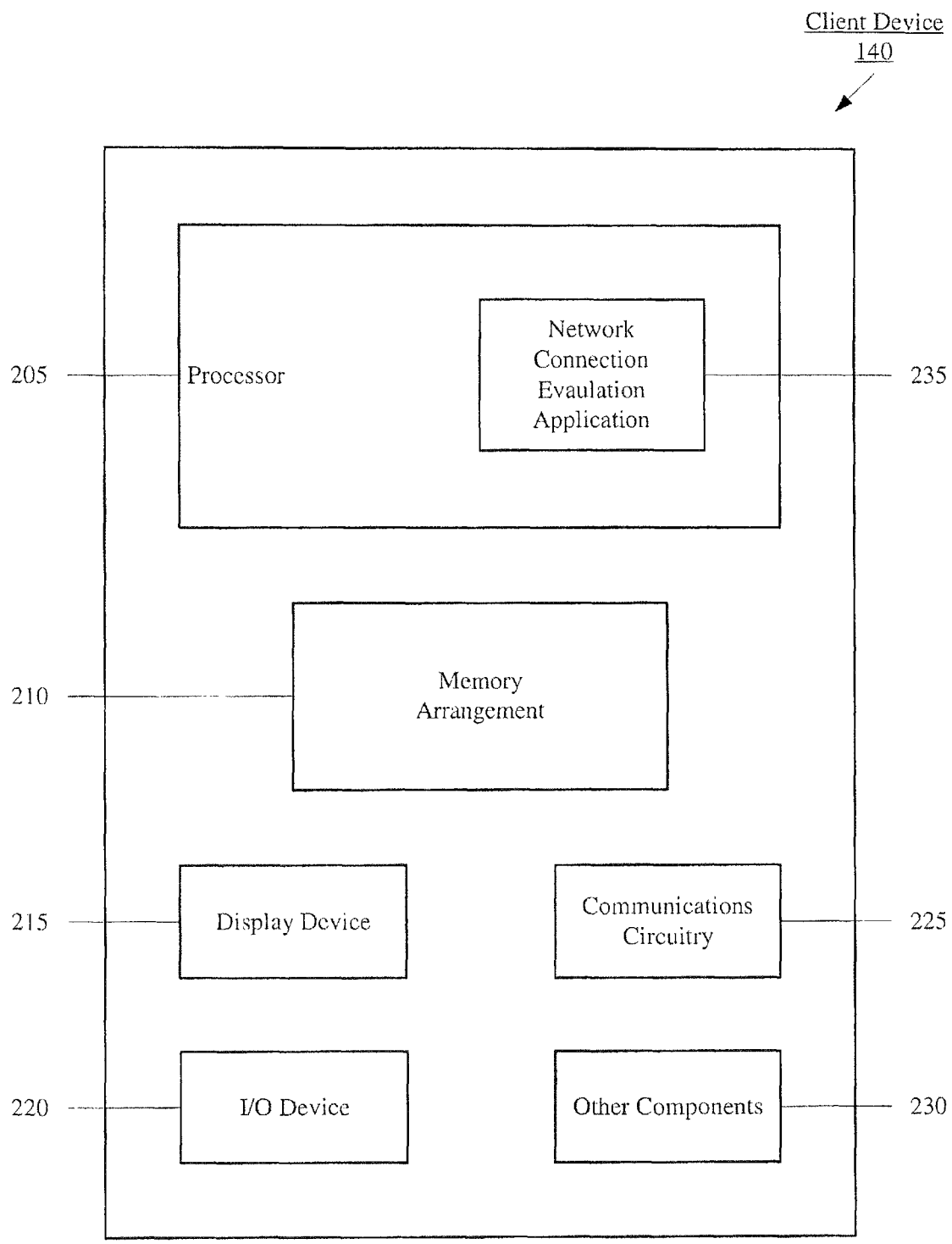
FIG. 2 shows an exemplary client device configured to determine whether a connection to a virtual private network is established.

Description of FIG. 2

FIG. 2 shows the exemplary client device 140 of FIG. 1. Specifically, the client device 140 is configured to determine whether a connection to a VPN should be established. The client device 140 may represent any electronic device configured to join a network such as a portable device (e.g., a cellular phone, a smartphone, a tablet, a phablet, a laptop, etc.) or a stationary device (e.g., a desktop computer, a Voice Over IP (VoIP) phone, etc.). The client device 140 may include a processor 205, a memory arrangement 210, a display device 215, an input/output (I/O) device 220, communications circuitry 225, and other components 230 such as a portable power supply, an audio I/O device, etc.

The processor 205 may be configured to execute a plurality of applications of the client device 140. For example, the applications may include a web browser when connected to the Internet 115 via the communications circuitry 225. Accordingly, a hostname included in a connection request that is registered in the RIR may be retrieved from a DNS lookup using the web browser. In another example, the applications may include a NCEA 235. The NCEA 235 may be configured to receive the connection request entered as an input for a particular application (e.g., the web browser) by a user. As was described above, the NCEA 235 may determine whether the connection request corresponds to establishing a connection with the VPN 125 or whether the connection request should not involve establishing a connection with the VPN 125.

It should be noted that the NCEA 235 being an application (e.g., a program) executed by the processor 205 is only exemplary. The NCEA 235 may also be represented as a separate incorporated component of the client device 140 or may be a modular component coupled to the client device 140.

The memory arrangement 210 may be a hardware component configured to store data related to operations performed by the client device 140. For example, the memory arrangement 210 may store a plurality of lists used by the NCEA 235. An exemplary list may be a domain list that includes a plurality of hostnames or portions thereof such that a match or a no-match with a hostname request may indicate that the NCEA 235 is to perform subsequent corresponding steps. The memory arrangement 210 may also store further data related to the NCEA 235 such as redirected addresses, cached routes, etc. The display device 215 may be a hardware component configured to show data to a user while I/O device 220 may be a hardware component configured to receive inputs from the user and output corresponding data such as a hostname request. The other components 230 may include a portable power supply (e.g., battery), a data acquisition device, ports to electrically connect the client device 140 to other electronic devices, etc.

The communications circuitry 225 may be or include one or more circuits for wireless communication (such as one or more of a baseband processor, a transceiver, and a radio frequency (RF) front-end), and which may implement one or more wireless communication technologies such as IEEE 802.11a/b/g/n/ac, Universal Mobile Telecommunications System (UMTS), Long Term Evolution (LTE), or LTE-Advanced (LTE-A). Alternatively or additionally, the communications circuitry 225 may be or include one or more circuits capable of performing wired communications (e.g., an Ethernet controller that performs Ethernet physical layer and media access control (MAC) layer functionality). Although FIG. 1 and FIG. 2 as shown and described above primarily refer to wireless communications between the client device 140 and the base station 135, in an embodiment wherein the communications circuitry 225 includes circuitry for wired communications, the client device 140 may connect to the Internet 115 and the private network 105, mutatis mutandis, via a wired network such as an Ethernet network (not shown in FIG. 1).

Description of FIG. 3

FIG. 3 shows an exemplary method 300 for establishing a connection between the client device 140 and the VPN. Specifically, the method 300 relates to determining if the connection is to be established based upon a connection request that is received from an application executed on the client device 140 such as the web browser. The method 300 will be described with regard to the network arrangement 100 of FIG. 1 and the client device 140 of FIG. 1 and FIG. 2.

In step 302, the NCEA 235 of the client device 140 receives the connection request. For example, the processor 205 may be executing the web browser application in which the user provides the connection request via the I/O device 220. The connection request may be for a publicly available domain on the Internet 115 or may be to establish a connection to the private network 105 via the VPN and the VPN server 130.

In step 304, the NCEA 235 determines whether the characteristics of the network to which the client device 140 is attempting to connect indicate that a VPN connection should be established. As described above, if the characteristics of the network match predetermined characteristics, the client device 140 will attempt to connect to the VPN. An example of characteristics that may be analyzed here include: the IP address(es) of the DNS server(s) that serve hosts on the network; the type of the network (e.g., whether the network is a cellular network or a WiFi network); identifying information of the network (such as a Service Set Identifier (SSID), in an instance where the network is a WiFi network); and/or other information. If the characteristics of the network match the predetermined characteristics, the client device 140 will attempt to connect to the VPN in step 306.

If the analysis of the network characteristics does not indicate that the VPN should be started, the NCEA 235 continues the method 300 to step 308. In step 308, the NCEA 235 determines whether the connection request includes a hostname or an address. It should be understood that a valid connection request will include either a hostname or an address. If the connection request includes an address, the NCEA 235 will continue to step 312 and ignore the VPN.

However, if the connection request includes a hostname, the NCEA 235 continues the method 300 from step 308 to step 310. At step 310, the NCEA 235 compares the hostname matches against a list of domains (e.g., "apple.com," "webserver.apple.com," and so on) that are eligible for triggering the VPN connection (pending further analysis, as will be described below with reference to step 312 and further steps). When a positive match against the list of domains is found at step 310, this positive match indicates that the hostname (from the connection request) may not be accessible externally but may be accessible via a VPN connection. If the hostname does not match any entry of the domain list, the NCEA 235 ignores the VPN.

When the hostname matches an entry in the domain list, the NCEA 235 continues the method 300 from step 310 to step 312 (and possibly further steps 314-320) that are related to a DNS of the hostname. The DNS generally relates to a hierarchical distributed naming system for computers, services, or any resource connected to the public network 115. The DNS associates information with domain names assigned to each of the participating entities. The DNS translates domain names to the numerical IP addresses needed for the purpose of locating computer services and devices in the Internet 115. That is, the DNS provides a keyword-based redirection service. The domain names of the participating entities and the corresponding IP addresses may be managed in the Internet 115 by the RIR. The RIR is an organization that manages the allocation and registration of number resources used in the Internet 115 within a particular region of the world. Internet number resources include IP addresses and autonomous system (AS) numbers. Accordingly, the corresponding hostnames of the IP addresses are also registered with the RIR. In this manner, the DNS lookup may be used to determine whether a domain exists on the Internet 115 from a corresponding hostname/IP address that is entered, for example, in the web browser.

In step 312, the NCEA 235 determines whether the hostname has an associated DNS server in which to perform a DNS lookup. The association may be for a preferred DNS server that is likely to provide a proper response to the DNS lookup for the hostname. For example, previous uses of a selected DNS server may have resulted in a proper address being returned. In another example, the client device 140 may also be configured to store associations between a hostname and a specific DNS server. Such associations may be stored in the memory arrangement 210. If the NCEA 235 determines that an association exists, the client device 140, in step 316, may transmit a request to the public network indicating a preference for a selected DNS server to perform a DNS lookup or query of the hostname included in the connection request. If no association has been stored for the hostname, the NCEA 235 continues the method 300 to step 318 where the NCEA 235 defers a selection of a DNS server to the public network to which the client device 140 is currently connected. In such a case, the DNS server selected by the network will perform the DNS lookup. In either case (steps 314 or 316), a DNS lookup on the hostname in the connection request will be performed.

It should be noted that the DNS lookup discussed above may be modified for specific domains. For example, the client device 140 may prevent transmitting the DNS lookup to an untrusted server, which may result in the subsequent analysis to be corrupt or incorrect. Instead, the client device 140 may transmit the DNS lookup to trusted servers only, other trusted third parties, or a personal, internal DNS server.

In step 318, the NCEA 235 determines whether an address is returned using either the DNS server selected by the public network to which the client device 140 is connected or the associated DNS server indicated by the client device 140 in the request. If an address is not returned (i.e., the DNS lookup fails) or a predetermined amount of time lapses without an address being returned (i.e., the DNS lookup times out) as indicated in step 328, the NCEA 235 continues the method 300 to step 306 in which the client device attempts to connect to the VPN. It should be noted that the DNS lookup time out may be a predetermined time that may also be modified depending on a variety of factors. For example, the client device 140 may be configured to measure network parameters (e.g., network load) that may affect how soon a result may be provided. Thus, the predetermined time may be lengthened as considered appropriate.

If the DNS lookup returns an address for the hostname, the NCEA 235 continues the method 300 to step 320, where it is determined whether the returned address matches an entry in a stored redirected address list. The redirected address list may indicate a plurality of addresses that redirect to a landing page or other page. The list of redirected addresses may be stored in a memory arrangement 210 of the client device 140. If the returned address is in the redirected address list, the NCEA 235 continues the method 300 to step 306 in which the client device attempts to connect to the VPN. The identification of a redirected address may provide a substantially similar result as the DNS lookup failing or timing out. Thus, as can be seen from the example of the determination of step 320, a return address from the DNS lookup does not automatically result in either a connection to the VPN being established or the VPN being ignored. Rather, there are additional determinations that are performed to determine whether the VPN connection should be established.

It should be noted that the list of redirected addresses may be generated by the client device 140 each time an entry is identified. For example, each time the client device 140 connects to a new network, the client device 140 may send out a dummy hostname request. A dummy hostname is a hostname having a string of characters that is unlikely to correspond to an actual hostname. Since it is very common to redirect to a common landing page, the result of the dummy hostname request, assuming a return address is received will be the same for any traffic that is redirected on the network. As described above, the client device 140 may store the addresses returned for the dummy hostname request as redirected addresses to be further used as described herein.

If the returned address does not match an entry in the redirected address list, the NCEA 235 continues the method 300 to step 322 where it is determined whether a hypertext transfer protocol secure (HTTPS) probe is configured for the hostname included in the connection request. HTTPS is a communications protocol for secure communication over a computer network such as the Internet 115. Specifically, HTTPS relates to layering the Hypertext Transfer Protocol (HTTP) on top of the Secure Sockets Layer (SSL)/Transport Layer Security (TLS) protocol which are cryptographic protocols, thus adding the security capabilities of SSL/TLS to standard HTTP communications. For example, the HTTPS may relate to servers that may spoof a destination domain.

If the HTTPS probe is configured for the hostname, the NCEA 235 continues the method 300 to step 324 where it is determined whether the HTTPS probe configured for the hostname fails. A failure of the HTTPS probe indicates that the client device 140 determined that there is no destination node associated with the hypertext of the HTTP. That is, there is no node in the Internet 115. If the HTTPS probe fails, the NCEA 235 continues the method 300 to step 306 in which the client device 140 attempts to connect to the VPN.

If the HTTPS probe is not configured for the hostname (as determined in step 322) or if the HTTPS probe is configured for the hostname and succeeds (as determined in step 324), the NCEA 235 continues the method 300 to step 326, where it is determined whether the returned address matches a stored cached route. The stored cached route may be a pathway that was previously used to establish a connection to a network component or end device. More specifically, the cached route may indicate a previously used pathway to establish a connection with the VPN server 130. The cached routes may be stored in a memory arrangement 210 of the client device 140. It should be noted that the cached routes may be pushed from the VPN server 130 to the client device 140 each time a connection has been established therebetween. Thus, the client device 140 may store a list of cached routes based on information derived by the client device 140 or pushed to the client device from another device (e.g., VPN server 130).

If the returned address does not match a cached route, the NCEA 235 continues the method 300 to step 312 in which the VPN is ignored. This determination of no cached routes in step 226 indicates that the hostname included in the connection request has a high probability of relating to a publicly available domain in the Internet 115 with no correspondence to the VPN. Specifically, there is a high probability that the hostname in the connection request that is received and satisfies the above criteria does not correspond to establishing a connection with the VPN. For example, the hostname in the connection request may to establish a connection with the network server 120.

If the returned address matches a stored cached route, the NCEA 235 continues the method 300 to step 328, where it is determined whether a Transmission Control Protocol (TCP) connection succeeds from using the returned address. The TCP is a protocol of the IP suite. TCP provides reliable, ordered, error-checked delivery of a stream of octets between applications running on client devices connected to the public network 115. For example, the web browser application uses TCP when it connects to servers on the World Wide Web of the Internet 115. The TCP is used to deliver data and transfer files from one location to another. Thus, if the TCP connection succeeds, this indicates the destination node exists on the Internet 115. Since there is an existing destination (e.g., the network server 120), the client device 140 may ignore the connection to the VPN as shown in the NCEA 235 continuing the method 300 to step 312 where the VPN is ignored.

If the TCP connection establishment is unsuccessful, the NCEA 235 continues the method 300 to step 306 in which the client device 140 attempts to connect to the VPN. The TCP connection establishment may be determined to be unsuccessful, for example, if the TCP connection establishment fails (e.g., there is no successful transmission of data) or the there is no acknowledgement of receipt of data (i.e., the TCP connection times out, such as not receiving a response in over 2 seconds).

It should also be noted that further steps used in establishing a connection to the VPN may be performed. For example, those skilled in the art will understand that the VPN relating to the private network 105 may use authentication procedures to ensure that the client device 140 and/or the user thereof is authorized to access the VPN. Accordingly, a username, a corresponding password, a digital certificate, a combination thereof, etc. may be transmitted upon determining that the VPN is to be triggered, a connection thereto is attempted, and the connection is successful.

Communicating Using a VPN Connection

The following describes some aspects of how, when the client device 140 establishes a VPN connection (for example, at step 306 in FIG. 3), communication using the VPN connection may be performed. The following will be described with regard to the network arrangement 100 of FIG. 1 and the client device 140 of FIG. 1 and FIG. 2.

The private network 105 utilizes a private IP address space for use within the private network 105. As an example, the private network may utilize 24-bit, 20-bit, or 16-bit blocks having IP address ranges of 10.0.0.0-10.255.255.255, 172.16.0.0-172.31.255.255, and 192.168.0.0-192.168.255.255, respectively. It should be noted that these IP addresses may correspond to hostnames as well (e.g., abc.xyz.com).

The client device 140 may have a public IP address 1.2.3.4 and may wish to communicate with the private network server 110. The private network server 110 may have an internal address 192.168.1.10 and may not be reachable publicly. Data exchanged between the client device 140 and the private network server 110 traverses the VPN server 130, which may have a public IP address 5.6.7.8 and an internal address of 192.168.1.1.

The client device 140 may utilize a VPN client that connects to the VPN server 130 via an external network interface. The VPN server 130 may assign an IP address to the VPN client from the VPN server's subnet. The VPN client may be assigned an internal IP address 192.168.1.50 and creates a virtual network interface through which it will send encrypted packets to the other tunnel endpoint. This interface may also be assigned the internal address 192.168.1.50.

When the VPN client wishes to communicate with the private network server 110, it prepares a packet addressed to 192.168.1.10, encrypts it, and encapsulates it in an outer VPN packet (e.g., an IPSec packet). This packet is then sent to the VPN server 130 at IP address 5.6.7.8 over the public network. The inner packet is encrypted so that even if it is intercepted on the public network 115, no information may be retrieved therefrom. The inner encrypted packet has source address 192.168.1.50 and destination address 192.168.1.10. The outer packet has source address 1.2.3.4 and destination address 5.6.7.8.

When the packet reaches the VPN server 130 from the public network 115, the VPN server 130 extracts the inner packet, decrypts it, finds the destination address to be 192.168.1.10, and forwards it (unencrypted) to the intended server at 192.168.1.10. The VPN server 130 may receive an (unencrypted) reply packet from 192.168.1.10, intended for 192.168.1.50. The VPN server 130 consults its routing table and sees this packet is intended for a remote host that must go through the VPN. The VPN server 130 encrypts this reply packet, encapsulates it in a VPN packet and sends it out over the public network 115. The inner encrypted packet has source address 192.168.1.10 and destination address 192.168.1.50. The outer VPN packet has source address 5.6.7.8 and destination address 1.2.3.4. Finally, the client device 140 receives the packet. The VPN client extracts the inner packet, decrypts it, and passes it to the appropriate software at upper layers.

Additional Applications of Described Concepts

Those skilled in the art will understand that the above-described exemplary embodiments may be implemented in any suitable software or hardware configuration or combination thereof. An exemplary hardware platform for implementing the exemplary embodiments may include, for example, an Intel based platform with compatible operating system (e.g., Windows), a Mac platform and Mac OS X, mobile platforms including mobile operating systems such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method for use in virtual private network (VPN) communications, the method comprising:
   at a client device:
      receiving, from an application executed on the client device, a request to connect to a destination identified by a hostname;
      performing a domain name system (DNS) lookup functionality on the hostname, the DNS lookup functionality returning an address,
      determining whether the returned address is a redirected address based on whether the returned address matches an entry in a stored list of redirected addresses;
      determining whether a hypertext transmission protocol secure (HTTPS) probe configured for the hostname fails;
      determining whether the returned address matches a cached route in which a transmission control protocol (TCP) connection establishment is unsuccessful; and
      connecting to a VPN when:
         the returned address is a redirected address;
         the HTTPS probe fails; or
         the returned address matches the cached route and the TCP connection establishment is unsuccessful.

2. The method of claim 1, wherein performing the DNS lookup functionality includes,
   transmitting a DNS lookup to one or more trusted servers only, and
   setting a DNS lookup timeout period based at least in part on one or more measured network parameters.

3. The method of claim 1, wherein the HTTPS probe failing is indicative of a second destination being unavailable in a public network, wherein the HTTPS probe succeeding is indicative of the second destination being publicly available on the public network.

4. The method of claim 3, wherein the TCP connection establishment being unsuccessful is indicative of the destination being unavailable in the public network, wherein the TCP connection establishment succeeding is indicative of a connection being established with the destination on the public network.

5. The method of claim 1, wherein determining whether the returned address is a redirected address includes:
   generating, by the client device, the list of redirected addresses by:
      sending a dummy hostname request;
      receiving a return address in response to the dummy hostname request; and
      storing, by the client device, in the list of redirected addresses, the return address received in response to the dummy hostname request.

6. The method of claim 1, wherein the stored list of redirected addresses comprises a least one address that redirects to at least one of a landing page or a further page.

7. The method of claim 1, wherein the stored list or redirected addresses is updated by the client device when the client device connects to a new network.

8. A client device, comprising:
   communications circuitry; and
   a processor,
   wherein the processor and communications circuitry are configured to establish a connection to a virtual private network (VPN) by:

receiving, from an application executed on the client device, a request to connect to a destination identified by a hostname;

performing a domain name system (DNS) lookup functionality on the hostname, the DNS lookup functionality returning an address, determining whether the returned address is a redirected address based on whether the returned address matches an entry in a stored list of redirected addresses;

determining whether a hypertext transmission protocol secure (HTTPS) probe configured for the hostname fails;

determining whether the returned address matches a cached route in which a transmission control protocol (TCP) connection establishment is unsuccessful; and connecting to a VPN when:
 the returned address is a redirected address;
 the HTTPS probe fails; or
 the returned address matches the cached route and the TCP connection establishment is unsuccessful.

9. The client device of claim 8, wherein performing the DNS lookup functionality includes the processor and the communications circuitry;
 transmitting a DNS lookup to one or more trusted servers only, and
 setting a DNS lookup timeout period based at least in part on one or more measured network parameters.

10. The client device of claim 8, wherein the HTTPS probe failing is indicative of a second destination being unavailable in a public network, wherein the HTTPS probe succeeding is indicative of the second destination being publicly available on the public network.

11. The client device of claim 10, wherein the TCP connection establishment being unsuccessful is indicative of the destination being unavailable in the public network, wherein the TCP connection establishment succeeding is indicative of a connection being established with the destination on the public network.

12. The client device of claim 8, wherein the processor and the communications circuitry is further configured to:
 generate the list of redirected addresses by:
  send a dummy hostname request;
  receive a return address in response to the dummy hostname request, wherein
  a memory arrangement stores in the list of redirected addresses, the return address received in response to the dummy hostname request.

13. The client device of claim 8, wherein the stored list of redirected addresses comprises a least one address that redirects to at least one of a landing page or a further page.

14. The client device of claim 8, wherein the stored list or redirected addresses is updated by the client device when the client device connects to a new network.

15. A non-transitory computer readable storage medium with an executable program stored thereon, wherein the program instructs a microprocessor to perform operations comprising:

receiving, from an application executed on a client device, a request to connect to a destination identified by a hostname;

performing a domain name system (DNS) lookup functionality on the hostname, the DNS lookup functionality returning an address, determining whether the returned address is a redirected address based on whether the returned address matches an entry in a stored list of redirected addresses;

determining whether a hypertext transmission protocol secure (HTTPS) probe configured for the hostname fails;

determining whether the returned address matches a cached route in which a transmission control protocol (TCP) connection establishment is unsuccessful; and connecting to a VPN when:
 the returned address is a redirected address;
 the HTTPS probe fails; or
 the returned address matches the cached route and the TCP connection establishment is unsuccessful.

16. The non-transitory computer readable storage medium of claim 15, wherein performing the DNS lookup functionality includes the microprocessor performing operations comprising;
 transmitting a DNS lookup to one or more trusted servers only, and
 setting a DNS lookup timeout period based at least in part on one or more measured network parameters.

17. The non-transitory computer readable storage medium of claim 15, wherein the HTTPS probe failing is indicative of a second destination being unavailable in a public network, wherein the HTTPS probe succeeding is indicative of the second destination being publicly available on the public network.

18. The non-transitory computer readable storage medium of claim 17, wherein the TCP connection establishment being unsuccessful is indicative of the destination being unavailable in the public network, wherein the TCP connection establishment succeeding is indicative of a connection being established with the destination on the public network.

19. The non-transitory computer readable storage medium of claim 15, wherein the microprocessor further performs operations comprising:
 generating the list of redirected addresses by:
  sending a dummy hostname request;
  receiving a return address in response to the dummy hostname request, and
  storing, in the list of redirected addresses, the return address received in response to the dummy hostname request.

20. The non-transitory computer readable storage medium of claim 15, wherein the stored list of redirected addresses comprises a least one address that redirects to at least one of a landing page or a further page.

* * * * *

UNITED STATES PATENT AND TRADEMARK OFFICE
CERTIFICATE OF CORRECTION

PATENT NO. : 10,547,649 B2  
APPLICATION NO. : 15/699006  
DATED : January 28, 2020  
INVENTOR(S) : Pauly Page 1 of 1

It is certified that error appears in the above-identified patent and that said Letters Patent is hereby corrected as shown below:

In the Claims

Claim 6, Column 10, Line 57:
"redirected addresses comprises a least one address that" should read "redirected addresses comprises at least one address that"

Claim 13, Column 11, Line 52:
"redirected addresses comprises a least one address that" should read "redirected addresses comprises at least one address that"

Claim 20, Column 12, Line 57:
"comprises a least one address that redirects to at least one of" should read "comprises at least one address that redirects to at least one of"

Signed and Sealed this  
Third Day of March, 2020

Andrei Iancu  
*Director of the United States Patent and Trademark Office*